United States Patent
Nicosia et al.

(10) Patent No.: US 11,802,213 B2
(45) Date of Patent: Oct. 31, 2023

(54) ICI THICKENER COMPOSITION AND USES

(71) Applicant: Elementis Specialties, Inc., East Windsor, NJ (US)

(72) Inventors: Carlo Nicosia, Enschede (NL); Eduardus Maria Mangnus, Deventer (NL); Kenneth F. Smith, Doylestown, PA (US)

(73) Assignee: ELEMENTIS SPECIALTIES, INC., East Windsor, NJ (US)

( * ) Notice: Subject to any disclaimer, the term of this patent is extended or adjusted under 35 U.S.C. 154(b) by 165 days.

(21) Appl. No.: 17/194,769

(22) Filed: Mar. 8, 2021

(65) Prior Publication Data
US 2021/0189154 A1 Jun. 24, 2021

Related U.S. Application Data

(63) Continuation of application No. 15/940,217, filed on Mar. 29, 2018, now abandoned.
(60) Provisional application No. 62/504,625, filed on May 11, 2017.

(51) Int. Cl.
| | |
|---|---|
| C09D 7/44 | (2018.01) |
| C08L 71/02 | (2006.01) |
| C08G 65/26 | (2006.01) |
| C08G 18/22 | (2006.01) |
| C09D 5/04 | (2006.01) |
| C08G 18/28 | (2006.01) |
| C08G 18/75 | (2006.01) |
| C08G 18/73 | (2006.01) |
| C08G 65/333 | (2006.01) |
| C08G 18/48 | (2006.01) |
| C08G 65/332 | (2006.01) |

(52) U.S. Cl.
CPC ............ *C09D 7/44* (2018.01); *C08G 18/227* (2013.01); *C08G 18/283* (2013.01); *C08G 18/4837* (2013.01); *C08G 18/73* (2013.01); *C08G 18/755* (2013.01); *C08G 65/2609* (2013.01); *C08G 65/2615* (2013.01); *C08G 65/3326* (2013.01); *C08G 65/33348* (2013.01); *C08L 71/02* (2013.01); *C09D 5/04* (2013.01); *C08L 2205/025* (2013.01); *C08L 2205/03* (2013.01)

(58) Field of Classification Search
CPC ............ C08G 18/4845; C08G 18/485; C08G 18/283; C08G 18/4837; C09D 7/43; C09D 7/44
See application file for complete search history.

(56) References Cited

U.S. PATENT DOCUMENTS

| | | | |
|---|---|---|---|
| 4,079,028 A | 3/1978 | Emmons et al. | |
| 4,155,892 A | 5/1979 | Emmons et al. | |
| 4,180,491 A | 12/1979 | Kim et al. | |
| 4,327,008 A | 4/1982 | Schimmel et al. | |
| 4,426,485 A | 1/1984 | Hoy et al. | |
| 4,882,408 A | 11/1989 | Blum | |
| 5,124,389 A | 6/1992 | Mente | |
| 5,594,087 A | 1/1997 | Konig et al. | |
| 6,107,394 A | 8/2000 | Broadbent et al. | |
| 6,316,546 B1 | 11/2001 | Ong et al. | |
| 6,916,369 B2 | 7/2005 | Chun et al. | |
| 7,432,325 B2 | 10/2008 | Blankenship et al. | |
| 9,550,859 B2 | 1/2017 | Mangnus et al. | |
| 2002/0052441 A1 | 5/2002 | Burdick et al. | |
| 2004/0106769 A1 | 6/2004 | Hatton et al. | |
| 2007/0055002 A1 | 3/2007 | Campbell et al. | |
| 2007/0155880 A1 | 5/2007 | Bobsein et al. | |
| 2009/0105411 A1* | 4/2009 | Erdem | C08G 18/7657 524/591 |
| 2010/0227953 A1 | 9/2010 | Bobsein et al. | |
| 2011/0052903 A1 | 3/2011 | Van Oorschot et al. | |
| 2012/0101199 A1 | 4/2012 | Li et al. | |
| 2014/0135468 A1 | 5/2014 | Freeman et al. | |
| 2015/0065629 A1 | 3/2015 | Freeman et al. | |

(Continued)

FOREIGN PATENT DOCUMENTS

| | | |
|---|---|---|
| CN | 1441818 A | 9/2003 |
| CN | 101003702 A | 7/2007 |

(Continued)

OTHER PUBLICATIONS

Examination Report dated May 21, 2021, issued in Indian Application No. 201917042786.
Office Action dated Dec. 31, 2021 issued in corresponding Chinese Patent Application No. 201880025987.9 (including English translation).
Office Action dated Oct. 6, 2021 issued in corresponding Taiwan Application No. 107112511 (English translation).
International Preliminary Report on Patentability dated Nov. 21, 2019 for corresponding PCT/US2018/025171, 7 pages.

(Continued)

*Primary Examiner* — Michael M Dollinger
(74) *Attorney, Agent, or Firm* — Carol A. Marmo; Eckert Seamans Cherin & Mellott LLC

(57) ABSTRACT

A viscosity regulating composition and its method of manufacture. The composition comprises a mixture of (a) a branched polymer having the formula $[M]-[(A^1O)-L^1-(A^1O)-R^1]_n$, wherein M is polybranched hydrophobe; $A^1O$ is a polyoxyalkylene unit; $L^1$ is an aliphatic linking segment or an aromatic linking segment each having at least two hydroxyl reactive linking groups; and $R^1$ is an aliphatic end unit or aromatic end unit having 6 to 32 carbon atoms; n ranges from 3 to 6; and (b) a polymer having the formula $R^2-(A^2O)-L^2-(A^2O)-R^2$, wherein $(A^2O)$ is a polyoxyalkylene unit, $L^2$ is a aliphatic linking segment or an aromatic linking segment, and $R^2$ is a aliphatic unit or an aromatic unit each having 6 to 32 carbon atoms.

12 Claims, No Drawings

(56) References Cited

U.S. PATENT DOCUMENTS

2015/0065630 A1 3/2015 Mangnus et al.
2018/0327615 A1 11/2018 Nicosia et al.

FOREIGN PATENT DOCUMENTS

| CN | 102101909 | A | 6/2011 |
| CN | 102786655 | A | 11/2012 |
| GB | 1 601 220 | A | 10/1981 |
| GB | 1601220 | A | 10/1981 |
| GB | 1601220 |   | 12/1981 |
| JP | 53-90493 |   | 8/1978 |
| JP | 59174694 | A | 10/1984 |
| JP | 9-20825 | A | 1/1997 |
| JP | 2000-72613 | A | 3/2000 |
| WO | 2015034679 | A1 | 3/2015 |
| WO | 2015034680 | A1 | 3/2015 |
| WO | 20150065680 | A1 | 3/2015 |

OTHER PUBLICATIONS

Extended European Search Report for corresponding Application No. EP 18 79 9367 dated Dec. 14, 2020, 6 pages.
International Search Report corresponding to PCT US2018/025171, dated Jun. 25, 2018, 3 pages.
Written Opinion corresponding to PCT US2018/025171, dated Jun. 25, 2018, 5 pages.
Brazilian Office Action dated Apr. 27, 2022 for Brazilian Patent Application No. BR112019020496-2, 8 pages including English translation.

\* cited by examiner

ICI THICKENER COMPOSITION AND USES

CROSS-REFERENCE TO RELATED APPLICATIONS

The present application is a continuation of prior U.S. application Ser. No. 15/940,217 filed Mar. 29, 2018 (pending), which claims the benefit from U.S. Provisional Patent Application No. 62/504,625 filed May 11, 2017, each of which is incorporated by reference herein in its entirety.

FIELD OF THE INVENTION

The present invention relates to ICI thickener compositions which are useful for modifying the rheological properties of paint formulations.

BACKGROUND OF THE INVENTION

Rheology modifiers are used in waterborne coatings formulations to control viscosity over a wide shear rate range. They may be associative (they associate with the dispersed phase) or non-associative (they thicken the water phase). Associative thickeners may be derived from natural products such as hydrophobically modified cellulose ethers, or prepared from synthetic polymers such as hydrophobically modified ethylene oxide urethane (HEUR) polymers. U.S. Pat. No. 4,155,892 (Emmons et al.) describes the preparation of linear as well as branched HEUR polymers in separate examples.

SUMMARY OF THE INVENTION

In one embodiment, the present disclosure provides for a viscosity regulating composition comprising a mixture of (a) a branched polymer having the formula $[M]-[(A^1O)-L^1-(A^1O)-R^1]_n$, wherein M is polybranched hydrophobe; $A^1O$ is a polyoxyalkylene unit; $L^1$ is an aliphatic linking segment or an aromatic linking segment each having at least two hydroxyl reactive linking groups; and $R^1$ is an aliphatic end unit or aromatic end unit having 2 to 32 carbon atoms; n ranges from 3 to 6; and (b) a polymer having the formula $R^2-(A^2O)-L^2-(A^2O)-R^2$, wherein $(A^2O)$ is a polyoxyalkylene unit, $L^2$ is a aliphatic linking segment or an aromatic linking segment, and $R^2$ is a aliphatic unit or an aromatic unit each having 2 to 32 carbon atoms.

In some embodiments, the viscosity regulating composition further comprises a polybranched polymer selected from (i) $[R^3-(A^3)-L^3-(A^3)]_{(n-1)}-M-[(A^3O)-L^3-(A^3O)]-M-[(A^3O)-L^3-(A^3O)-R^3]_{(n-1)}$; (ii) $\{[R^4-(A^4O)-L^4-(A^4O)]_{(n-1)}-M-[(A^4O)-L^4-(A^4O)]\}\{-M-[(A^4O)-L^4-(A^4O)-R^4]_{(n-2)}-[(A^4O)-L^4-(A^4O)]\}_m-\{M-[(A^4)-L^4-(A^4)-R^4]_{(n-1)}\}$; (iii) and combinations thereof. In such embodiments, $L^3$ and $L^4$ are each an aliphatic linking segment or an aromatic linking segment each having at least two hydroxyl reactive linking groups; and $R^3$ and $R^4$ are each an aliphatic end unit or aromatic end unit having 2 to 32 carbon atoms; n ranges from 3 to 6.

In some embodiments, the viscosity regulating composition further comprises a second polymer having the formula $[M]-[(A^1O)-\{L-(A^1O)\}_m-R^1]_n$ wherein m ranges from 2 to 4.

In some embodiments of the foregoing viscosity regulating compositions, the polyhydric alcohol is independently selected from the group consisting of: trimethanolpropane, pentaerythritol, dipentaerythritol, erythritol, xylitol, sorbitol, mannitol, inositol, glycopyranose and mixtures thereof.

In some embodiments of the foregoing viscosity regulating composition, $(A^1O)$, $(A^2O)$, $(A^3O)$ and $(A^4O)$ each have a structure independently selected from:

$$-(-EO-)_q[(-EO-)_x-(-PO-)_y](-EO-)_z- \quad (i)$$

where q+x+z ranges from 50 to 250 and y ranges from 0 to 50; and (EO) and (PO) of $[(-EO-)_x-(-PO-)_y]$ are randomly distributed throughout $[(-EO-)_x-(-PO-)_y]$;

$$-(-EO-)_q(-PO-)_y(-EO-)_z-, \quad (ii)$$

where q+z ranges from 50 to 250 and y ranges from 2 to 50; and (EO) and (PO) are block copolymers;

$$-(-PO-)_q[(-EO-)_x-(-PO-)_y](-EO-)_z-, \quad (iii)$$

where x+z ranges from 50 to 250 and q+y ranges from 2 to 50; and (EO) and (PO) of $[(-EO-)_x-(-PO-)_y]$ are randomly distributed throughout $[(-EO-)_x-(-PO-)_y]$ while PO of $(-PO-)_q$ is a block polymer. PO of $(-PO-)_q$ can be directly linked to either R and/or M;

$$-(-EO-)_q[(-EO-)_x-(-PO-)_y](-PO-)_z-, \quad (iv)$$

where q+x ranges from 50 to 250 and y+z ranges from 2 to 50; and (EO) and (PO) of $[(-EO-)_x-(-PO-)_y]$ are randomly distributed throughout $[(-EO-)_x-(-PO-)_y]$ while PO of $(-PO-)_z$ is a block polymer. PO of $(-PO-)_z$ is linked to L; or $$-(-PO-)_q[(-EO-)_x-(-PO-)_y](-PO-)_z-, \quad (v)$$

where x ranges from 50 to 250 and q+y+z ranges from 4 to 50; and (EO) and (PO) of $[(-EO-)_x-(-PO-)_y]$ are randomly distributed throughout $[(-EO-)_x-(-PO-)_y]$ while PO of $(-PO-)_q$ and $(-PO-)_z$ are block polymers.

In yet another embodiment, the present disclosure provides for an aqueous thickener composition including the various embodiments of viscosity regulating composition described herein and a viscosity suppressing additive selected from an organic co-solvent, a surfactant, or combinations thereof, and water. In some embodiments, the aqueous thickener composition includes 5 wt. % to 50 wt. % of the composition and water.

In still yet another embodiment, the present disclosure provides for an aqueous thickener composition including the various embodiments of viscosity regulating composition described herein and water. In such an embodiment, the aqueous thickener composition does not contain a viscosity suppressant such as an organic solvent, including butoxyethanol, diethylene glycol monobutyl ether, triethylene glycol monobutyl ether, propylene glycol, and other water miscible organic solvents, an inorganic salt, such as sodium chloride or a nonionic or anionic surfactant.

In still yet another embodiment, the present disclosure provides for a method to improve ICI viscosity of an aqueous composition. An effective amount of a viscosity regulating composition is provided to an aqueous composition, wherein the ICI viscosity of the aqueous composition ranges from 0.5 to 5.0 Poise.

DETAILED DESCRIPTION OF THE EMBODIMENTS

As used herein, "aliphatic" refers to saturated or partially unsaturated linear-, branched-, or cycloaliphatic, or combinations thereof.

As used herein, "EO" refers to ethylene oxide.

As used herein "PO" refers to propylene oxide.

In one embodiment, the present disclosure provides for a viscosity regulating composition comprising a mixture of (a) a branched polymer having the formula $[M]-[(A^1O)-L^1-$ $(A^1O)-R^1]_n$, wherein M is polybranched hydrophobe; $A^1O$ is a polyoxyalkylene unit; $L^1$ is an aliphatic linking segment or an aromatic linking segment each having at least two hydroxyl reactive linking groups; and $R^1$ is an aliphatic end unit or aromatic end unit having 2 to 32 carbon atoms; n ranges from 3 to 6; and (b) a polymer having the formula $R^2-(A^2O)-L^2-(A^2O)-R^2$, wherein $(A^2O)$ is a polyoxyalkylene unit, $L^2$ is a aliphatic linking segment or an aromatic linking segment, and $R^2$ is a aliphatic unit or an aromatic unit each having 2 to 32 carbon atoms. In such embodiments, the branched polymer having the formula $[M]-[(A^1O)-L^1-(A^1O)-R^1]_n$ has a molecular weight ranging from 13,000 g/mole to 170,000 g/mole and the polymer having the formula $R^2-(A^2O)-L^2-(A^2)-R^2$ has a molecular weight ranging from 4,000 g/mole to 30,000 g/mole.

In some embodiments, the viscosity regulating composition further comprises a poly branched polymer selected from (i) $[R^3-(A^3O)-L^3-(A^3O)]_{(n-1)}-M-[(A^3O)-L^3-(A^3O)]-M-[(A^3O)-L^3-(A^3O)-R^3]_{(n-1)}$; (ii) $\{[R^4-(A^4O)-L^4-(A^4O)]_{(n-1)}-M-[(A^4O)-L^4-(A^4O)]\}$ $\{-M-[(A^4O)-L^4-(A^4O)-R^4]_{(n-2)}-[(A^4O)-L^4-(A^4O)]\}_m-\{M-[(A^4O)-L^4-(A^4O)-R^4]_{(n-1)}\}$; (iii) and combinations thereof. In such embodiments, $L^3$ and $L^4$ are each an aliphatic linking segment or an aromatic linking segment each having at least two hydroxyl reactive linking groups; and $R^3$ and $R^4$ are each an aliphatic end unit or aromatic end unit having 2 to 32 carbon atoms; n ranges from 3 to 6.

In some of the foregoing embodiments, the viscosity regulating compositing further includes a polymer having a molecular weight higher than $\{[R^4-(A^4O)-L^4-(A^4O)]_{(n-1)}-M-[(A^4O)-L^4-(A^4O)]\}$ $\{-M-[(A^4O)-L^4-(A^4O)-R^4]_{(n-2)}-[(A^4O)-L^4-(A^4O)]\}_m-\{M-[(A^4O)-L^4-(A^4O)-R^4]_{(n-1)}\}$ with end groups of $[R^4-(A^4O)-L^4-(A^4O)-M-]$, internal segments of $\{-M-[(A^4O)-L^4-(A^4O)-R^4]_{(n-2)}-[(A^4O)-L^4-(A^4O)]\}$ and/or an internal segment of $\{M-[(A^5O)-L^5-(A^5O)-M-]_{(n-1)}\}$. A skilled person will understand that gel permeation chromatography can be used to determine the relative molecular weights of such polymers.

In some embodiments, the viscosity regulating composition further comprises a second polymer having the formula $[M]-[(A^1O)-\{L^1-(A^1O)\}_m-R^1]_n$ wherein m ranges from 2 to 4.

In some embodiments, the amount of branched polymer ranges from: 1 wt. % to 20 wt. %; 1 wt. % to 40 wt. %; and 1 wt. % to 90 wt. % each based on the total weight of the viscosity regulating composition.

In some embodiments, M is a polybranched hydrophobe derived from a polyhydric alcohol having 3 to 6 reactive hydroxyl groups. In some such embodiments of the viscosity regulating composition, M is derived from a polyhydric alcohol independently selected from the group consisting of: trimethanolpropane, pentaerythritol, erythritol, dipentaerythritol, xylitol, sorbitol, mannitol, inositol, glycopyranose and mixtures thereof. In another embodiment M is derived from alkoxylated amines independently selected from the group consisting of: triethanolamine, N,N,N',N'-tetrakis(2-hydroxyethyl)ethylenediamine, N,N,N',N'',N''-pentakis(2-hydroxyethyl)diethylenetriamine, N,N,N',N'',N''',N'''-hexakis(2-hydroxyethyl)triethylenetetramine, triisopropanolamine, N,N,N',N'-tetrakis(2-hydroxyisopropyl)ethylenediamine, N,N,N',N'',N''-pentakis(2-hydroxyisopropyl)diethylenetriamine, N,N,N',N'',N''',N'''-hexakis(2-hydroxyisopropyl)triethylenetetramine.

In some embodiments of the foregoing viscosity regulating composition, $(A^1O)$, $(A^2)$, $(A^3O)$, $(A^4O)$ and $(A^5O)$ each have a structure independently selected from:

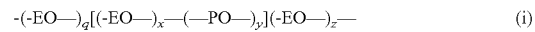 (i)

where q+x+z ranges from 50 to 250 and y ranges from 0 to 50; and (EO) and (PO) of $[(-EO-)_x-(-PO-)_y]$ are randomly distributed throughout $[(-EO-)_x-(-PO-)_y]$;

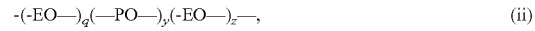 (ii)

where q+z ranges from 50 to 250 and y ranges from 2 to 50; and (EO) and (PO) are block copolymers;

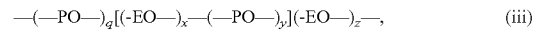 (iii)

where x+z ranges from 50 to 250 and q+y ranges from 2 to 50; and (EO) and (PO) of $[(-EO-)_x-(-PO-)_y]$ are randomly distributed throughout $[(-EO-)_x-(-PO-)_y]$ while PO of $(-PO-)_q$ is a block polymer. PO of $(-PO-)_q$ can be directly linked to either R and/or M;

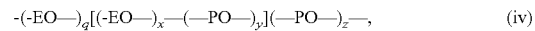 (iv)

where q+x ranges from 50 to 250 and y+z ranges from 2 to 50; and (EO) and (PO) of $[(-EO-)_x-(-PO-)_y]$ are randomly distributed throughout $[(-EO-)_x-(-PO-)_y]$ while PO of $(-PO-)_z$ is a block polymer. PO of $(-PO-)_z$ is linked to L; or

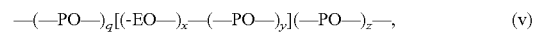 (v)

where x ranges from 50 to 250 and q+y+z ranges from 4 to 50; and (EO) and (PO) of $[(-EO-)_x-(-PO-)_y]$ are randomly distributed throughout $[(-EO-)_x-(-PO-)_y]$ while PO of $(-PO-)_q$ and $(-PO-)_z$ are block polymers.

In some embodiments of the foregoing viscosity regulating composition $L^1$, $L^2$, $L^3$, $L^4$ and $L^5$ are each independently an aliphatic linking segment or an aromatic linking segment having at least two linking groups. In some embodiments of the foregoing viscosity regulating composition $L^2$ is an aliphatic linking segment or an aromatic linking segment having at least two linking groups. In some embodiments, $L^1$, $L^2$, $L^3$, $L^4$ and $L^5$ may be the same aliphatic linking segment or aromatic linking segment. In some embodiments, $L^1$, $L^2$, $L^3$, $L^4$ and $L^5$ may be different aliphatic linking segment or aromatic linking segment.

In some embodiments of the foregoing viscosity regulating compositions, $L^1$, $L^2$, $L^3$, $L^4$ and $L^5$ are each independently aliphatic linking segment or an aromatic linking segment each having at least two linking groups each independently selected from: urethane linking group (O—C(=O)—NH), urea linking group (N(R)—C(=O)—NH), ether linking group (—O—), ester linking group (—C(=O)O—), amine linking group (—NH—), an aminoplast segment, a linking group which is the residue from reaction of an epihalohydrin and a hydroxyl group. In such embodiments, the aliphatic linking segment or an aromatic linking segment, $L^1$, $L^2$, $L^3$, $L^4$ and $L^5$ may have the same linking groups. In other such embodiments, the aliphatic linking segment or an aromatic linking segment $L^1$, $L^2$, $L^3$, $L^4$ and $L^5$ may have different linking groups.

In some embodiments, the aliphatic linking segment or aromatic linking segment, $L^1$, $L^2$, $L^3$, $L^4$ and $L^5$, may have an urethane linking group derived from a diisocyanate independently selected from the group consisting of 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis (isocyanatocyclohexane), 1,4-cyclohexylene diisocyanate, isophorone diisocyanate, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenyldiisocyanate, 1,5-naphthylene diisocyanate, 1,5-tetrahydronaphthylene diisocyanate and mixtures thereof. In a certain embodiment, $L^1$ and/or $L^2$ are urethane linking groups derived from a diisocyanate independently selected from the group consisting 1,4 tetramethylene diisocyanate, 1,6-hexamethylene diisocyanate or isophorone diisocyanate.

In other embodiments, the aliphatic linking segment or aromatic linking segment, $L^1$, $L^2$, $L^3$, $L^4$ and $L^5$, may have an ester linking group derived from a diacid independently selected from the group consisting of propanedioic acid, butanedioic acid, pentanedioic acid, hexanedioic acid, heptanedioic acid, octanedioic acid, nonanedioic acid, decanedioic acid and mixtures thereof. In still other such embodiments, the aliphatic linking segment or aromatic linking segment, $L^1$ and/or $L^2$, may have an ester linking group derived from a diester independently selected from the group consisting of dimethyl succinate, dimethyl adipate, dimethyl glutarate, dimethyl pimelate, dimethyl suberate, dimethyl azelate, dimethyl sebacate, diethyl succinate, diethyl adipate, diethyl glutarate, diethyl pimelate, diethyl suberate, diethyl azelate, diethyl sebacate and combinations thereof.

In yet still other such embodiments, the aliphatic linking segment or aromatic linking segment, $L^1$, $L^2$, $L^3$, $L^4$ and $L^5$, may have an ether linking group derived independently selected from the group consisting of 1,3-butadiene diepoxide, 1,2,7,8-diepoxyoctane, 1,2,5,6-diepoxycyclooctane, limonene diepoxide, bis(polyoxyethylene bis[glycidyl ether], bisphenol A diglycidyl ether, diglycidyl ether, ethylene glycol diglycidyl ether, propylene glycol diglycidyl ether and combinations thereof.

In yet other such embodiments, the aliphatic linking segment or aromatic linking segment, $L^1$, $L^2$, $L^3$, $L^4$ and $L^5$, may have an ether linking group derived from a dihalo compound independently selected from the group consisting of dihalomethane, dihaloethane, dihalopropane, dihalobutane, dihalopentane, dihalohexane, dihaloheptane, dihalooctane, dihalononane, dihalodecane, dihalododecane, and combinations thereof.

In some embodiments of the foregoing viscosity regulating compositions, $R^1$, $R^2$, $R^3$ and/or $R^4$ are each independently selected from the group consisting of a linear alkyl group, a branched alkyl group, a cyclic alkyl group, a linear alkylaryl group, a branched alkylaryl group and combinations thereof. In some such embodiments, the alkyl group, of the linear alkyl group, a branched alkyl group, a cyclic alkyl group, has 2 to 16, 6 to 14 or 6 to 12 carbon atoms.

In some such embodiments, $R^1$, $R^2$, $R^3$ and/or $R^4$ are each independently selected from butyl, hexyl, ethylhexyl, octyl, decyl, dodecyl, tetradecyl, hexadecyl, 2-butyloctyl and 2-hexyldecyl, tristyryl phenol, distyryl phenol, styryl phenol and combinations thereof.

In one embodiment of the foregoing viscosity regulating compositions, the linear alkyl group or branched alkyl group, of $R^1$, $R^2$, $R^3$ and/or $R^4$, are respectively derived from a linear aliphatic alcohol or branched aliphatic alcohol wherein the alkyl group has 4 to 16, 6 to 14 or 6 to 12 carbon atoms. In one embodiment, the linear alkyl alcohol or branched alkyl alcohol independently includes 2-ethylhexanol, 1-octanol, 1-nonanol, 1-decanol, 1-dodecanol, or 1-tetradecanol. In another embodiment the aliphatic alcohol is derived from di-n-octylaminoethanol, 1-(dibutylamino)-2-butanol, di-2-ethylhexylaminoethanol, di-hexylaminoethanol, 2-(dioctylamino)-ethanol, 2-(dibutylamino) ethanol, 2-(diheptylamino) ethanol, 2-(dihexylamino) ethanol, 2-(dicocoamino) ethanol, 6-dipropylamino-1-hexanol, 1-(bis(3-(dimethylamino)propyl)amino)-2-propanol, and 2-(diethylhexylamino)-ethanol. In some embodiments, the alkyl group is derived from 1-decanol, 2-(n-butyl)-1-octanol, 2-ethylhexanol, 1-nonanol, 1-dodecanol and mixtures thereof.

In one embodiment of the foregoing viscosity regulating compositions, the linear alkyl group or branched alkyl group, of $R^1$, $R^2$, $R^3$ and/or $R^4$, are derived from an amine selected from, diethylamine, diallylamine, dipropylamine, diisopropylamine, dibutylamine, dipentylamine, dihexylamine, dioctylamine, di-(2-ethylhexyl)amine, dicyclohexylamine, dibenzylamine, morpholine, piperidine, pyrrolidine, N-methylpiperazine and the product of these amines with epoxides.

In one embodiment of the foregoing viscosity regulating compositions, a linear alkylaryl group or a branched alkylaryl group, of $R^1$, $R^2$, $R^3$ and/or $R^4$, are derived from an aromatic alcohol wherein the aryl group has 6 to 32 carbon atoms, 6 to 22 carbon atoms or 6 to 14 carbon atoms. In one such embodiment, the linear alkylaryl group or branched alkylaryl group are independently derived from tristyryl phenol, distyryl phenol, styryl phenol and mixtures thereof.

In one certain embodiment of the viscosity regulating composition, the composition comprises a mixture of (a) a branched polymer having the formula $[M]-[(A^1O)-L^1-(A^1O)—R^1]_n$, wherein M is derived from trimethylolpropane, $A^1O$ is a polyoxyalkylene unit, $L^1$ is derived from 1,4 tetramethylene diisocyanate, 1,6-hexamethylene diisocyanate or isophorone diisocyanate, and $R^1$ is derived from decanol, dodecanol or tetradecanol; and (b) a polymer having the formula $R^2-(A^2O)-L^2-(A^2O)—R^2$, wherein $(A^2O)$ is a polyoxyalkylene unit, $L^2$ is derived from 1,4 tetramethylene diisocyanate, 1,6-hexamethylene diisocyanate or isophorone diisocyanate, and $R^2$ is derived from decanol, dodecanol or tetradecanol. In one such embodiment, the viscosity regulating composition may further include one or more polybranched polymer selected from (i) $[R^3-(A^3)-L^3-(A^3)]_2-M-[(A^3O)-L^3-(A^3O)]-M-[(A^3O)-L^3-(A^3O)—R^3]_2$; (ii) $\{[R^3-(A^3O)-L^3-(A^3O)]_2-M-[(A^3O)-L^3-(A^3O)]\}-\{M-[(A^3O)-L^3-(A^3O)—R^3]-[(A^3O)-L^3-(A^3O)]\}_{(2-4)}-M-[(A^3)-L^3-(A^3)-R^3]_2$; and (iii) combinations thereof; wherein $L^3$ is independently derived from 1,4 tetramethylene diisocyanate, 1,6-hexamethylene diisocyanate or isophorone diisocyanate, and $R^3$ is independently derived from decanol, dodecanol or tetradecanol. For the foregoing embodiments, the branched polymer having the formula $[M]-[(A^1O)-L^1-(A^1O)—R^1]_n$ has a molecular weight ranging from 13,000 g/mole to 90,000 g/mole and the polymer having the formula $R^2-(A^2O)-L^2-(A^2O)—R^2$ has a molecular weight ranging from 4,000 g/mole to 30,000 g/mole. For the foregoing embodiments, $(A^1O)$, $(A^2O)$ and $(A^3O)$ each have a structure according to formula (I):

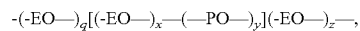

where q+x+z ranges from 50 to 250 and y ranges from 0 to 50; and (EO) and (PO) of $[(-EO—)_x—(—PO—)_y]$ are randomly distributed throughout $[(-EO—)_x—(—PO—)_y]$.

In one certain embodiment of the viscosity regulating composition, the composition comprises a mixture of (a) a branched polymer having the formula $[M]-[(A^1O)-L^1-(A^1O)—R^1]_n$, wherein M is derived from pentaerythritol, $A^1O$ is a polyoxyalkylene unit, $L^1$ is derived from 1,4 tetramethylene diisocyanate, 1,6-hexamethylene diisocyanate or isophorone diisocyanate, and $R^1$ is derived from decanol, dodecanol or tetradecanol; and (b) a polymer having the formula $R^2-(A^2O)-L^2-(A^2)-R^2$, wherein $(A^2O)$ is a polyoxyalkylene unit, $L^2$ is derived from 1,4 tetramethylene diisocyanate, 1,6-hexamethylene diisocyanate or isophorone diisocyanate, and $R^2$ is derived from decanol, dodecanol or tetradecanol. In one such embodiment, the viscosity regulating composition may further include one or more polybranched polymer selected from (i) $[R^3-(A^3O)-L^3-(A^3O)]_3-M-[(A^3O)-L^3-(A^3O)]-M-[(A^3O)-L^3-(A^3O)-R^3]_3$; (ii) $\{[R^3(A^3O)-L^3(A^3O)]_3-M-[(A^3O)-L^3-(A^3O)]\}-\{M-[(A^3O)-L^3-(A^3O)-R^3]_2-[(A^3O)-L^3-(A^3O)]\}_{(2-4)}-M-[(A^3O)-L^3-(A^3O)-R^3]_3$; and (iii) and combinations thereof, wherein $L^3$ is independently derived from 1,4 tetramethylene diisocyanate, 1,6-hexamethylene diisocyanate or isophorone diisocyanate, and $R^3$ is independently derived from decanol, dodecanol or tetradecanol. In such embodiments, the branched polymer having the formula $[M]-[(A^1O)-L^1-(A^1O)-R^1]_n$ has a molecular weight ranging from 17,000 g/mole to 120,000 g/mole and the polymer having the formula $R^2-(A^2O)-L^2-(A^2O)-R^2$ has a molecular weight ranging from 4,000 g/mole to 30,000 g/mole. In the foregoing embodiments, $(A^1O)$, $(A^2O)$ and $(A^3O)$ each have a structure according to formula (I): $-(-EO-)_q[(-EO-)_x-(-PO-)_y](-EO-)_z-$, where q+x+z ranges from 50 to 250 and y ranges from 0 to 50; and (EO) and (PO) of $[(-EO-)_x-(-PO-)_y]$ are randomly distributed throughout $[(-EO-)_x-(-PO-)_y]$.

The present disclosure further provides for an aqueous thickening composition containing the various embodiments of the viscosity regulating composition described herein and water. In some embodiments, the aqueous thickening composition may contain 5-50 wt. % of the ICI viscosity regulating composition described herein and water. In some embodiments, the aqueous thickening composition may contain 5-30 wt. % of the ICI viscosity regulating composition described herein and water. In some embodiments, the aqueous thickening composition may contain 15-30 wt. % of the ICI viscosity regulating composition described herein and water. In such embodiments of the aqueous thickening composition, the aqueous thickening composition does not contain a viscosity suppressant when the viscosity, of the aqueous thickening composition is less than 10000 cP. Such viscosity suppressants include organic solvents, such as butoxyethanol, diethylene glycol monobutyl ether, triethylene glycol monobutyl ether, propylene glycol, and other water miscible organic solvents, an inorganic salt, such as sodium chloride or a nonionic or anionic surfactant. In some such embodiments, the aqueous thickening composition further contains a biocide, an anti-oxidant and combinations thereof. In the foregoing embodiments, the aqueous thickening composition may have a viscosity ranging from: 100 to 2500 cP or 100 to 5000 cP or 100 to 10000 cP.

The present disclosure further provides for an aqueous thickening composition containing the various embodiments of the viscosity regulating composition described herein, a viscosity suppressant and water. In some embodiments, the aqueous thickening composition may contain 5-50 wt. % of the ICI viscosity regulating composition described herein, a viscosity suppressant and water. In some embodiments, the aqueous thickening composition may contain 5-30 wt. % of the ICI viscosity regulating composition described herein, a viscosity suppressant and water. In some embodiments, the aqueous thickening composition may contain 15-30 wt. % of the ICI viscosity regulating composition described herein, a viscosity suppressant and water. In such embodiments, the viscosity suppressant includes organic solvents, such as butoxyethanol, diethylene glycol monobutyl ether, triethylene glycol monobutyl ether, propylene glycol, and other water miscible organic solvents, an inorganic salt, such as sodium chloride or a nonionic or anionic surfactant. In some such embodiments, the aqueous thickening composition further contains a biocide, an anti-oxidant and combinations thereof. In the foregoing embodiments, the aqueous thickening composition may have a viscosity of up to: 2500 cP; 5000 cP; 10,000 cP; 15,000 cP; 20,000 cP; or 25,000 cP. In one such embodiment, the aqueous thickening composition may have a viscosity ranging from: 100 to 2500 cP; 100 to 5000 cP; 100 to 10000 cP; 100 to 15,000 cP; 100 to 20,000 cP; or 100 to 25,000 cP. In one embodiment, the aqueous thickening may have a viscosity ranging from: 100 to 2500 cP or 100 to 5000 cP.

The Brookfield viscosities of such aqueous thickening compositions are measured at 25° C. and 10 RPM using a Brookfield RV or RVT. Typically a #1 spindle is used for materials having a Brookfield viscosity of 400-600 cP (40-60 dial reading), a #2 spindle is used for materials having a Brookfield viscosity of 1600-2400 cP and a #3 spindle is used for materials having a Brookfield viscosity of 4000-6000 cP. The following table may also be used to determine the appropriate spindle to use when measuring Brookfield viscosity at 25° C. and 10 RPM:

| Spindle | Factor | Viscosity (cP) | |
| --- | --- | --- | --- |
| | | Mid-dial | Max |
| 1 | 10 | 500 | 1000 |
| 2 | 40 | 2000 | 4000 |
| 3 | 100 | 5000 | 10000 |
| 4 | 200 | 10000 | 20000 |
| 5 | 400 | 20000 | 40000 |
| 6 | 1000 | 50000 | 100000 |
| 7 | 4000 | 200000 | 400000 |

In another embodiment, the present invention provides for a method to improve ICI viscosity of an aqueous composition comprising: providing an effective amount of a viscosity regulating composition according to the various embodiments described herein to an aqueous composition, wherein the ICI viscosity of the aqueous composition ranges from 0.5 to 5.0 Poise.

Methods of Manufacture

The present disclosure provides for various methods of manufacturing the various embodiments of the viscosity regulating composition described herein. For each of the embodiments of methods of manufacturing, described below, the skilled person should look to the description of M, L, R and AO as described above herein for the various embodiments of the viscosity regulating composition.

In one embodiment, the present disclosure provides for a method of manufacturing a viscosity regulating composition comprising the following steps. A solvent-free melt is formed of (i) an alkoxylated polyhydroxy segment, having the formula $[M]-(AO)_n$ having 3 to 6 reactive hydroxyl linking groups, n ranges from 3 to 6, a molecular weight ranging from 10,000 g/mole to 50,000 g/mole, and (ii) an alkoxylated aliphatic end segment or alkoxylated aromatic end segment, having the formula (AO)—R and a reactive hydroxyl linking group and a molecular weight ranging from 2,000 g/mole to 10,000 g/mole. The solvent-free melt is contacted with aliphatic linking segments or aromatic linking segments, L, each having at least two hydroxyl reactive linking groups under conditions sufficient to form a composition comprising a mixture of a branched polymer having the formula $[M]-[(AO)-L-(AO)-R]_n$ and a polymer having the formula R-(AO)-L-(AO)—R, wherein the mole ratio of the alkoxylated polyhydroxyl segment to the alkoxylated aliphatic end segment or alkoxylated aromatic end segment ranges from 1:3 to 1:30; 1:3 to 1:14; 1:9 to 1:22. In certain embodiments, the composition further comprises a poly branched polymer selected from (i) $[R\text{-}(AO)\text{-}L\text{-}(AO)]_{(n-1)}\text{-}M\text{-}[(AO)\text{-}L\text{-}(AO)]\text{-}M\text{-}[(AO)\text{-}L\text{-}(AO)\text{---}R]_{(n-1)}$; (ii) $\{[R\text{-}(AO)\text{-}L\text{-}(AO)]_{(n-1)}\text{-}M\text{-}[(AO)\text{-}L\text{-}(AO)]\}$ $\{\text{-}M\text{-}[(AO)\text{-}L\text{-}(AO)\text{---}R]_{(n-2)}\text{-}[(AO)\text{-}L\text{-}(AO)]\}_m\text{-}\{M\text{-}[(AO)\text{-}L\text{-}(AO)\text{---}R]_{(n-1)}\}$; (iii) and combinations thereof.

In another embodiment, the present disclosure provides for a method of manufacturing a viscosity regulating composition comprising the following steps. A solvent-free melt is formed of (i) an alkoxylated polyhydroxyl segment, having the formula $[M]\text{-}(AO)_n$ having 3 to 6 reactive hydroxyl linking groups, n ranges from 3 to 6, a molecular weight ranging from 1,000 g/mole to 10,000 g/mole, and (ii) an alkoxylated aliphatic end segment or alkoxylated aromatic end segment, having the formula $(AO)\text{---}R$, a reactive hydroxyl linking group and a molecular weight ranging from 500 g/mole to 2,000 g/mole. The solvent-free melt is contacted with ethylene oxide, propylene oxide or combination thereof under conditions sufficient to form a mixture of an alkoxylated polyhydroxyl segment having a molecular weight ranging from 10,000 g/mole to 50,000 g/mole and an alkoxylated aliphatic end segment or alkoxylated aromatic end segment having a molecular weight ranging from 2,000 g/mole to 10,000 g/mole. The solvent-free melt is then contacted with aliphatic linking segments or aromatic linking segments, L, each having at least two hydroxyl reactive linking groups under conditions sufficient to form a composition comprising a mixture of a branched polymer having the formula $[M]\text{-}[(AO)\text{-}L\text{-}(AO)\text{---}R]_n$ and a polymer having the formula $R\text{-}(AO)\text{-}L\text{-}(AO)\text{---}R$, wherein the mole ratio of the alkoxylated polyhydroxyl segment to the alkoxylated aliphatic end segment or alkoxylated aromatic end segment ranges from 1:3 to 1:30; 1:3 to 1:14; 1:9 to 1:22. In certain embodiments, the composition further comprises a poly branched polymer selected from (i) $[R\text{-}(AO)\text{-}L\text{-}(AO)]_{(n-1)}\text{-}M\text{-}[(AO)\text{-}L\text{-}(AO)]\text{-}M\text{-}[(AO)\text{-}L\text{-}(AO)\text{---}R]_{(n-1)}$; (ii) $\{[R\text{-}(AO)\text{-}L\text{-}(AO)]_{(n-1)}\text{-}M\text{-}[(AO)\text{-}L\text{-}(AO)]\}$ $\{\text{-}M\text{-}[(AO)\text{-}L\text{-}(AO)\text{---}R]_{(n-2)}\text{-}[(AO)\text{-}L\text{-}(AO)]\}_m\text{-}\{M\text{-}[(AO)\text{-}L\text{-}(AO)\text{---}R]_{(n-1)}\}$; (iii) and combinations thereof.

In another embodiment, the present disclosure provides for a method of manufacturing viscosity regulating composition comprising the following steps. At least two moles of an alkoxylated aliphatic end segment or alkoxylated aromatic end segment, having the formula $(AO)\text{---}R$ and a reactive hydroxyl linking group and a molecular weight ranging from 2,000 g/mole to 10,000 g/mole, are reacted with aliphatic linking segments or aromatic linking segments, L, having at least two hydroxyl reactive linking groups under conditions sufficient to form a composition having a formula of $R\text{-}(AO)\text{-}L\text{-}(AO)\text{---}R$. The composition having a formula of $R\text{-}(AO)\text{-}L\text{-}(AO)\text{---}R$ is added to a solvent free melt of (i) an alkoxylated polyhydroxyl segment, having the formula $[M]\text{-}(AO)_n$ having 3 to 6 reactive hydroxyl linking groups, n ranges from 3 to 6, a molecular weight ranging from 10,000 g/mole to 50,000 g/mole, and (ii) an alkoxylated aliphatic end segment or alkoxylated aromatic end segment, having the formula $(AO)\text{---}R$ and a reactive hydroxyl linking group and a molecular weight ranging from 2,000 g/mole to 10,000 g/mole. The solvent-free melt is contacted with aliphatic linking segments or aromatic linking segments, L, each having at least two hydroxyl reactive linking groups under conditions sufficient to form a composition having the formula branched polymer having the formula $[M]\text{-}[(AO)\text{-}L\text{-}(AO)\text{---}R]_n$, wherein the mole ratio of the alkoxylated polyhydroxyl segment to the alkoxylated aliphatic end segment or alkoxylated aromatic end segment ranges from 1:3 to 1:30; 1:3 to 1:14; 1:9 to 1:22. In certain embodiments, the composition further comprises a poly branched polymer selected from (i) $[R\text{-}(AO)\text{-}L\text{-}(AO)]_{(n-1)}\text{-}M\text{-}[(AO)\text{-}L\text{-}(AO)]\text{-}M\text{-}[(AO)\text{-}L\text{-}(AO)\text{---}R]_{(n-1)}$; (ii) $\{[R\text{-}(AO)\text{-}L\text{-}(AO)](0.1)\text{ -}M\text{-}[(AO)\text{-}L\text{-}(AO)]\}$ $\{\text{-}M\text{-}[(AO)\text{-}L\text{-}(AO)\text{---}R]_{(n-2)}\text{-}[(AO)\text{-}L\text{-}(AO)]\}_m\text{-}\{M\text{-}[(AO)\text{-}L\text{-}(AO)\text{---}R]_{(n-1)}\}$; (iii) and combinations thereof.

Paint Formulations

A variety of paint formulations may be formulated using the viscosity regulating composition described herein and/or the aqueous thickening compositions, as described herein. In one embodiment, a paint formulation includes: 10-50 wt. % solids of a resin system; 0.0-2.0 wt. % actives of an associative co-thickener; 0.1-3.0 wt. % actives of the ICI viscosity regulating composition according to the various embodiments discussed herein; and optionally 1-12 wt. % of a colorant composition.

In one embodiment, the ICI viscosity of a paint formulation ranges from 0.5 to 5.0 Poise. In another embodiment, the ICI viscosity of a paint formulation ranges from 0.5 to 4.0 Poise. In yet another embodiment, the ICI viscosity of a paint formulation ranges from 0.5 to 3.0 Poise. In still yet another embodiment, the Stormer viscosity of a paint formulation is at least 60 KU. In another such embodiment, the Stormer viscosity of a paint formulation ranges from 60 KU to 130 KU.

A paint formulation of some embodiments of the present invention may include one or more resin film forming binders. A binder, or resin, is the actual film forming component of paint. It is an essential component of a base paint; and other components listed herein are included optionally, depending on the desired properties of the cured film. Binders can be categorized according to drying, or curing mechanism. The four most common are simple solvent evaporation, oxidative crosslinking, catalyzed polymerization, and coalescence.

In some embodiments, the resin binder is a water dispersible resin, such as a water dispersible alkyd or water dispersible polyurethane. In some embodiments, the resin binder is a water soluble resin. In certain embodiments, the resin binder is an emulsion resin, such as is typically used to manufacture latex paints. In certain embodiments, the resin includes a hydrophobic resin. Representative hydrophobic emulsion resins may include (meth)acrylic resin, a styrene acrylic resin, a styrene resin or other ethylenically unsaturated monomers. Representative examples of hydrophilic emulsion resins may include a vinyl acrylic resin or a vinyl acetate ethylene resin. In certain embodiments, the resin may have a substantially spherical shape and a large particle size or low surface area. In one embodiment, the particle size may be greater than about 200 nm. In a further embodiment, the particle size ranges from about 220 nm to about 650 nm. In certain embodiments, the resin may have a substantially spherical shape and small particle size or high surface area. In one embodiment, the particle size may be less than about 200 nm. In a further embodiment, the particle size ranges from about 40 nm to about 180 nm. In certain embodiments, the resin may have a multilobe shape. Representative resins may include Optive 130 (BASF, acrylic, 160 nm), UCAR 300 (Dow, vinyl acrylic, 260 nm), UCAR 625 (Dow, acrylic, 340 nm), Rhoplex ML-200 (Rohm & Haas, acrylic, 590 nm multilobe), and Neocryl XK-90 (DSM Neoresins, acrylic, 90 nm). In certain embodiments, combinations of resins are used to prepare the base paint.

The paint formulation may also include at least one associative co-thickener. Associative co-thickeners are water soluble, water dispersible, or water swellable polymers that have chemically attached hydrophobic groups. In certain embodiments, a paint formulation includes a condensation polymer associative co-thickener including but not limited to polyether polyurethanes, polyether polyols, polyether polyacetals, polyether aminoplasts and the like. In some embodiments, a paint formulation includes about 0.05 wt % to about 5 wt % as active polymer of a condensation polymer associative co-thickener, about 0.1 wt % to about 3 wt % as active polymer of a condensation polymer associative co-thickener, or about 0.2 wt % to about 1 wt % as active polymer of a condensation polymer associative co-thickener.

In some embodiments, the associative co-thickener includes polyurethane thickener; a hydrophobically modified cellulose; a hydrophobically modified alkali soluble thickener; an alkali soluble thickener; a cellulose thickener; a polyacetalpolyether; polyetherpolyol thickener; smectite clays and mixtures thereof.

In other embodiments, the associative co-thickeners include nonionic hydrophobically modified materials including nonionic hydrophobically-modified ethylene oxide urethane copolymers, nonionic hydrophobically-modified ethylene oxide ether copolymers, nonionic hydrophobically-modified ethylene oxide glycouril copolymers, hydrophobically-modified alkali soluble emulsions, hydrophobically-modified poly(meth)acrylic acids, hydrophobically-modified hydroxyethyl cellulose, and hydrophobically-modified poly(acrylamide), and mixtures thereof. The number average molecular weights of the associative co-thickeners may range from about 10,000 to about 500,000 g/mole or more, depending on the chemical type of associative thickener. In some embodiments, the number average molecular weight of the associate do-thickeners may range from about 10,000 to about 50,000 g/mole. In some embodiments, the number average molecular weight of the associate co-thickeners may range from about 100,000 to about 300,000 g/mole. In some embodiments, the number average molecular weight of the associate co-thickeners may range from about 400,000 to about 500,000 g/mole or more.

In another embodiment, the associative co-thickener may include an KU associative thickener which is used to increase the low to mid shear viscosity of a composition.

A colorant containing paint formulation of the present invention may also include any suitable colorant. In some embodiments, a predispersed colorant may be added to a paint formulation. It is to be understood that this invention is equally effective with single colorants or mixtures of colorants.

Within the context of this invention, a colorant or colorant compound may include one or more colored pigment(s) which have been dispersed in an aqueous or water-miscible medium external to the paint in which it is intended to be used by use of mechanical energy, i.e., grinding or shearing by means of dispersing equipment such as, for example, a ball mill and a sand mill and then dispersed into a base paint. For the purposes of this disclosure, colorant does not include pigments in a dry undispersed state. The dispersion process is typically achieved by the use of auxiliary compounds such as, for example, surfactants, wetting agents, water-miscible solvents, and dispersants, in addition to mechanical energy. The aqueous or water-miscible medium may also include glycols such as ethylene glycol and propylene glycol, and alcohols such as isopropanol. Dispersants may include polyethylene oxide polymers, polyethylene oxide glycols and others. The aqueous or water-miscible medium may also include extenders such as talc and calcium carbonate; humectants; thickeners; defoamer; and biocides. Such colorants are frequently added to a base paint or tint base at the point-of-sale to produce custom colors.

Pigments which are commonly used to prepare colorants include one or more inorganic or organic pigments, or metal effect agents, or combinations thereof. Examples of suitable pigments include titanium dioxide white, carbon black, lamp black, black iron oxide, red iron oxide, yellow iron oxide, brown iron oxide (a blend of red and yellow oxide with black), phthalocyanine green, phthalocyanine blue, organic red pigment (such as naphthol red, quinacridone red and toluidine red), quinacridone magenta, quinacridone violet, DNA orange, and organic yellow pigment (such as Hansa yellow) and combinations thereof.

The colorants are usually sold in concentrated form (typically 25% to 75% solids by weight) so that modest amounts can be used in a waterborne coating composition to provide a desired range of color intensities while not compromising the properties of the waterborne coating composition unduly. Typical amounts of colorants which are used in architectural coatings are from 2 to 4 fluid ounces of colorant per gallon of base paint for light tint bases and pastels, from 4 to 8 fluid ounces of colorant per gallon of base paint for medium tint bases, and from 6 to 16 fluid ounces of colorant per gallon of base paint for deep tone tint bases. Of course, different colorants and mixtures thereof are frequently used to provide wide latitude in color selection. Such colorants are frequently added to a base paint at the point-of-purchase of the colored paint, such as a paint store, followed by admixing the colorant and the waterborne coating composition by various means such as shaking the can of paint.

A paint system of some embodiments of the present invention may include additional components as suitable to achieve the desire effect, including but not limited to wetting agents, fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

Paint formulations may be characterized by a variety of properties including Stormer (KU) viscosity, ICI viscosity, sag and leveling.

Stormer viscosity relates to the in-can appearance and is typically measured in Krebs units (KU) using a Stormer viscometer. Mid-shear or Stormer viscosity was measured by the test method described in ASTM D562-01 "Standard Test Method Consistency of Paints Measuring Krebs Unit (KU) Viscosity Using a Stormer-Type Viscometer."

ICI viscosity represents the viscosity of the paint during typical brush and roller application conditions. It is typically measured at 10,000 $sec^{-1}$ by the test method described in ASTM D4287-00 "Standard Test Method for High-Shear Viscosity Using a Cone/Plate Viscometer."

The sag and leveling properties of a film, on a substrate, formed by application of a paint formulation, containing the mid-shear regulating composition, were also measured. Sag values were measured following the test method described in ASTM D4400-99 (Reapproved 2007) "Standard Test Method for Sag Resistance of Paints Using a Multinotch Applicator." The leveling values were measured following the test method described in ASTM D4062-99 (Reapproved 2003) "Standard Test Method for Leveling of Paints by Draw-Down Method."

By way of a non-limiting example, the compounds encompassed herein are used to make high-shear (e.g., ICI) viscosity regulating compositions.

For the purposes of this disclosure, the term "about" means plus or minus 10%.

EXAMPLES

The following examples further describe and demonstrate illustrative embodiments within the scope of the present invention. The examples are given solely for illustration and are not to be construed as limitations of this invention as many variations are possible without departing from the spirit and scope thereof. For reactions using diisocyanate reactants, a catalyst such as an organo-tin or bismuth ester or an amine may be added to accelerate the reaction at the desired temperature.

Example 1

A viscosity regulating composition was prepared as follows: To a 500 ml reaction kettle equipped with a nitrogen inlet, stirrer, Dean Stark trap and a condenser, 50.00 g of alkoxylated trimethylolpropane (Mn: 18160, 2.75 mmol), 52.65 g of alkoxylated lauryl alcohol (Mn: 6375, 8.25 mmol), 0.15 g benzoic acid (MW: 122.12, 1.23 mmol) and 300 g of toluene were added. The alkoxylate groups of alkoxylated trimethylolpropane and alkoxylated lauryl alcohol were a mixture of ethylene oxide and propylene oxide. The reaction mixture was stirred at 250 rpm and dewatered at 130° C., with a $N_2$ purge, 0.5 ml/min, to remove 120 ml of the toluene/$H_2O$ mixture. The reaction was cooled to 80° C. followed by addition of 1.39 g of hexamethylene diisocyanate (HDI) (MW: 168.19: 8.26 mmol) and 3 drops of K-Kat 348. The reaction is stirred at 80° C. for 1.5 hour. The mixture was cooled and poured onto a metal tray to evaporate toluene. The composition was further dried in a vacuum oven.

Example 2

Same procedure described in Example A replacing the alkoxylated lauryl alcohol with 52.65 g of alkoxylated decyl alcohol (Mn: 6375, 8.25 mmol). The alkoxylate group of alkoxylated decyl alcohol was a mixture of ethylene oxide and propylene oxide.

Example 3

Same procedure described in Example A replacing the alkoxylated lauryl alcohol with 52.65 g of alkoxylated tetradecyl alcohol (Mn: 6375, 8.25 mmol). The alkoxylate group of alkoxylated tetradecyl alcohol was a mixture of ethylene oxide and propylene oxide.

Example 4

A viscosity regulating composition was prepared as follows:

(i) To a 5000 ml reaction kettle equipped with a nitrogen inlet, stirrer, and a distillation setup, 481.4 g of alkoxylated lauryl alcohol (Mn: 1620, 0.297 mol, base value: 4.0 mgKOH/g), and 121.5 g of alkoxylated trimethylolpropane (Mn: 4500, 0.027 mol, base value: 2.9 mgKOH/g) were added. The alkoxylate groups of alkoxylated trimethylolpropane and alkoxylated lauryl alcohol were a mixture of ethylene oxide and propylene oxide. The reaction mixture was stirred at 250 rpm and dewatered at 125° C., with a $N_2$ purge, 0.5 ml/min, until a water content of <250 ppm was reached. The mixture was heated to 115° C. the kettle was closed. In $N_2$ atmosphere, 2010.6 g ethylene oxide (MW: 44.10; 45.59 mol) and 305 g propylene oxide (MW: 58.08; 5.25 mol) were added under pressure in 8 hours. The reaction mixture was stirred at 115° C. for 3 hours.

(ii) 700 g of the reaction mixture prepared in (i), was heated to 120° C. and 1.18 g benzoic acid (MW: 122.12, 9.66 mmol) was added to neutralize the base catalyst used for the alkoxylation reaction. The reaction was stirred at 120° C. for 30 minutes, followed by dropwise addition of 9.44 g of hexamethylene diisocyanate (HDI) (MW: 168.19: 56.15 mmol). The reaction mixture was stirred at 120° C. for 1.5 hour followed by addition of water till the required dry content was reached.

Example 5

Same procedure described in Example 4 replacing 192.8 g of alkoxylated lauryl alcohol (Mn: 1620, 0.119 mol, base value: 4.0 mgKOH/g) with 192.8 g of alkoxylated decyl alcohol (Mn: 1620, 0.119 mol, base value: 4.0 mgKOH/g).

Example 6

A viscosity regulating composition was prepared as follows: To a 250 ml reaction kettle equipped with a nitrogen inlet, stirrer and a condenser, 50.00 g of alkoxylated pentaerythritol (Mn: 24930, 2.01 mmol), 179.38 g of alkoxylated lauryl alcohol (Mn: 6375, 24.08 mmol), and 0.39 g benzoic acid (MW: 122.12, 2.81 mmol) were added. The reaction mixture was stirred at 250 rpm and dewatered at 130° C., with a $N_2$ purge, 0.5 ml/min. The reaction was heated to 120° C. followed by addition of 3.26 g of hexamethylene diisocyanate (HDI) (MW: 168.19: 18.05 mmol). The reaction mixture was stirred at 120° C. for 1.5 hour followed by addition of water till the required dry content was reached.

Table 1. Brookfield viscosity of the 20 wt. % solution of the viscosity regulating composition and Brookfiled/ICI viscosities of the paint (semigloss Mowilith LDM 7717, PVC30) upon addition of 0.6 wt % of the viscosity regulating composition.

| | BF viscosity/cP | Paint application | |
|---|---|---|---|
| Example | 20 wt % solution in water Spindle 64, 12 rpm, 23° C. | BF viscosity/cP Spindle 64, 12 rpm, 23° C. | ICI viscosity/P 750 rpm, 25° C. |
| 1 | 8500 | 4750 | 3.64 |
| 2 | 400 | 450 | 0.91 |
| 3 | >100,000 | 21,500 | 1.07 |
| 4 | 1880 | 4500 | 2.47 |

-continued

| Example | BF viscosity/cP 20 wt % solution in water Spindle 64, 12 rpm, 23° C. | Paint application BF viscosity/cP Spindle 64, 12 rpm, 23° C. | Paint application ICI viscosity/P 750 rpm, 25° C. |
|---|---|---|---|
| 5 | 1250 | 1850 | 1.97 |
| 6 | 2050 | 3000 | 2.49 |
| Benchmark 1 | 2130 | 1160 | 1.16 |
| Benchmark 2 | 2450 | 2100 | 2.19 |

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A viscosity regulating composition comprising a mixture of
   (a) a branched polymer having the formula $[M]-[(A^1O)-L^1-(A^1O)-R^1]_n$ wherein M is a polybranched hydrophobe; $(A^1O)$ is a polyoxyalkylene unit; $L^1$ is an aliphatic linking segment or an aromatic linking segment; $R^1$ is an aliphatic unit or an aromatic unit each having 2 to 32 carbon atoms; and
   (b) a polymer having the formula $R^2-(A^2O)-L^2-(A^2O)-R^2$, wherein $(A^2O)$ is a polyoxyalkylene unit, $L^2$ is an aliphatic linking segment or an aromatic linking segment, and $R^2$ is an aliphatic unit or an aromatic unit each having 2 to 32 carbon atoms,
   wherein $(A^1O)$ and $(A^2O)$ each have a formula of $-(-EO-)_q[(-EO-)_x-(-PO-)_y](-PO-)_z-$, where q+x ranges from 50 to 250 and y+z ranges from 2 to 50; and (EO) and (PO) of $[(-EO-)_x-(-PO-)_y]$ are randomly distributed throughout $[(-EO-)_x-(-PO-)_y]$ while PO of $(-PO-)_z$ is a block polymer, wherein PO of $(-PO-)_z$ is linked to $L^1$ or $L^2$, wherein $R^1$ and $R^2$ are each derived from a linear aliphatic alcohol, a branched aliphatic alcohol or an aromatic alcohol, and n ranges from 3 to 6.

2. The viscosity regulating composition of claim 1, wherein M is derived from a polyhydric alcohol independently selected from the group consisting of: trimethanolpropane, pentaerythritol, erythritol, dipentaerythritol, xylitol, sorbitol, mannitol, inositol, glycopyranose and mixtures thereof.

3. The viscosity regulating composition of claim 2, wherein $L^1$ and $L^2$ each have least two linking groups independently selected from: urethane linking group, urea linking group, ether linking group, ester linking group, amine linking group, an aminoplast segment, a linking group which is the residue from reaction of an epihalohydrin and a hydroxyl group.

4. The viscosity regulating composition of claim 3, wherein $L^1$ and $L^2$ have an urethane linking group derived from a diisocyanate independently selected from the group consisting of 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, isophorone diisocyanate, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenyldiisocyanate, 1,5-naphthylene diisocyanate, 1,5-tetrahydronaphthylene diisocyanate and mixtures thereof.

5. The viscosity regulating composition of claim 1, wherein $R^1$ and $R^2$ are each independently selected from the group consisting of a linear alkyl group, a branched alkyl group, a cyclic alkyl group, and combinations thereof, each having 2 to 16 carbon atoms.

6. The viscosity regulating composition of claim 5, wherein $R^1$ and $R^2$ are independently selected from butyl, hexyl, ethylhexyl, octyl, nonyl, decyl, dodecyl, tetradecyl, hexadecyl, 2-butyloctyl and 2-hexyldecyl, and combinations thereof.

7. The viscosity regulating composition of claim 1, wherein $R^1$ and $R^2$ are independently selected from the group consisting of a linear alkylaryl group or a branched alkylaryl group, wherein the aryl group has 6 to 32 carbon atoms.

8. The viscosity regulating composition of claim 7, wherein $R^1$ and $R^2$ are each derived from tristyryl phenol, distyryl phenol, styryl phenol and mixtures thereof.

9. An aqueous thickener composition comprising: the viscosity regulating composition according to claim 1 and water.

10. The aqueous thickener composition according to claim 9, having 5 wt. % to 50 wt. % of the viscosity regulating composition.

11. The aqueous thickener composition according to claim 10, further comprising a viscosity suppressant independently selected from the group consisting of organic solvents, butoxyethanol, diethylene glycol monobutyl ether, triethylene glycol monobutyl ether, propylene glycol, and other water miscible organic solvents, an inorganic salt, sodium chloride or a nonionic or anionic surfactant.

12. The aqueous thickener composition according to claim 10, having a viscosity ranging from 100 to 10000 cP in the absence of a viscosity suppressant independently selected from the group consisting of organic solvents, butoxyethanol, diethylene glycol monobutyl ether, triethylene glycol monobutyl ether, propylene glycol, and other water miscible organic solvents, an inorganic salt, sodium chloride or a nonionic or anionic surfactant.

* * * * *